Figure 1:
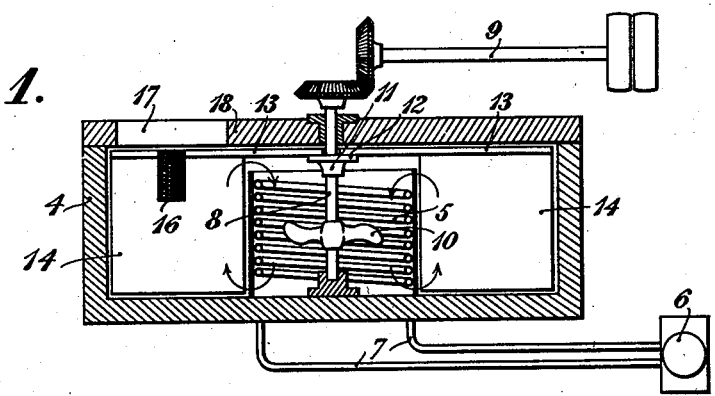

A. J. A OTTESEN.
METHOD OF PRESERVING COMESTIBLES.
APPLICATION FILED NOV. 8, 1912.

1,129,716.   Patented Feb. 23, 1915.

UNITED STATES PATENT OFFICE.

ANTON JENSENIUS ANDREAS OTTESEN, OF THISTED, DENMARK.

METHOD OF PRESERVING COMESTIBLES.

1,129,716.  Specification of Letters Patent.  Patented Feb. 23, 1915.

Application filed November 8, 1912. Serial No. 730,209.

*To all whom it may concern:*

Be it known that I, ANTON JENSENIUS ANDREAS OTTESEN, of Thisted, Jutland, in the Kingdom of Denmark, have invented certain new and useful Improvements in Methods of Preserving Comestibles, of which the following is a specification, reference being had therein to the accompanying drawing.

This invention refers to a method of freezing or refrigerating juicy or watery food commodities, such as fish, meat, fruits, etc. The invention is based upon the discovery that said food commodities, under certain conditions, can be directly treated with a refrigerating liquid consisting of salts, acids, bases, or other strongly tasting substances which are capable of lowering the melting point, without these substances entering from the refrigerating liquid into the commodities. Under the conditions referred to the food commodities can be frozen superficially or throughout without injuring either their inner or outer natural properties of value.

A better understanding of this invention may be obtained from the following: If a saturated saline solution has a temperature suitable for freezing purposes, say ten degrees below zero, Celsius, and if one directly dips into this cold brine watery food-commodities, such as, for instance, fish of a temperature above the freezing point, say about ten degrees above zero, Celsius, the primarily ensuing effect will be that the surfaces of contact of the fish and the brine react on each other not only thermically but also osmotically, with the result that the brine absorbs some moisture from the surface of the fish, while the latter absorbs some salt from the brine. Secondly, this salt will diffuse deeper into the skin and flesh of the fish. Thirdly, one or the other of the following two effects will then take place in a more or less marked degree. If the amount of cold present is sufficiently great, owing to the relatively great quantity of the brine, and if the fish is quickly enough subjected to a sufficiently great quantity of cold, for instance by means of stirring the brine, the quantity of salt primarily and secondarily absorbed by the fish will not be sufficient to keep the liquid in the skin and flesh of the fish in a fluid state under the resulting temperature, which quickly approaches ten degrees below zero. Then the liquid in the skin of the fish will first freeze, and the cold will diffuse into the flesh; but even if all the liquid in the fish freezes to ice with relatively rapidity, the osmotic absorption of salt from the brine will, nevertheless, not entirely cease, but the salt will continue to penetrate into and diffuse itself into the dry substances of the skin and flesh. If, on the other hand, the quantity of cold present is quite small, or if the fish is not quickly enough subjected to a sufficient quantity of cold, owing to deficient stirring, the quantity of salt absorbed primarily and secondarily by the liquids or tissues of the fish will enable these liquids to keep themselves in a fluid state under the resulting temperature, which will be essentially higher than ten degrees below zero, Celsius. The primary and secondary absorption and diffusion of the salt can, therefore, still be continued, with the result that the fish, which is refrigerated without stiffening, will simultaneously become more and more permeated with salt. In practice, there may be imagined many forms of transition between these two extremes; but in all cases, a primary absorption of the salt is unavoidable.

The object of the present invention is to freeze or refrigerate food commodities direct in brine without the commodities absorbing salt, *id est*, to make the brine a perfectly indifferent conductor of cold. In order to attain this object, it is necessary to restrain the tendency of the brine to precipitate or deposit salt, or to absorb moisture and thereby become diluted. In accordance with my invention this result is principally accomplished in such a manner that the brine, which is to a certain degree diluted or partially unsaturated with salt, is refrigerated to or, if possible under the reduced freezing-point of the dissolving medium. A refrigerating liquid of this kind reacts in an essentially different manner than the one described above. Its special feature is a tendency to form ice which is free from the dissolved salt and not to combine with moisture with which it is brought into contact, but immediately to freeze this moisture without having entered into osmotic, reciprocal action with it. While drops of water brought into contact with a brine of the kind first described above, even if the temperature of the brine is, for instance, twelve degrees below zero, Celsius, will not fail to mix with the brine and themselves become brine, drops of water coming into contact with the last described, unsaturated and sub-cooled brine will, on the other hand, even if the temperature of the brine is only for instance, eight degrees below zero, Celsius, immediately be incased in a membrane of ice, and will quickly be transformed into pellets of fresh ice. It is obvious that a brine of this latter kind, which is on or under the reduced crystallizing point even of the dissolving medium, is fully suited to produce the strictly indifferent and purely physical conservation of food commodities referred to above. When brine of any other kind is used, however, it is, as aforesaid, impossible to avoid salting, since this takes place as a consequence of osmose, no matter whether the brine is or is not on the crystallizing-point of the dissolved salt.

I will now proceed to illustrate my invention by giving an example of how it may be performed, referring to the drawing in which—

Figure 2:
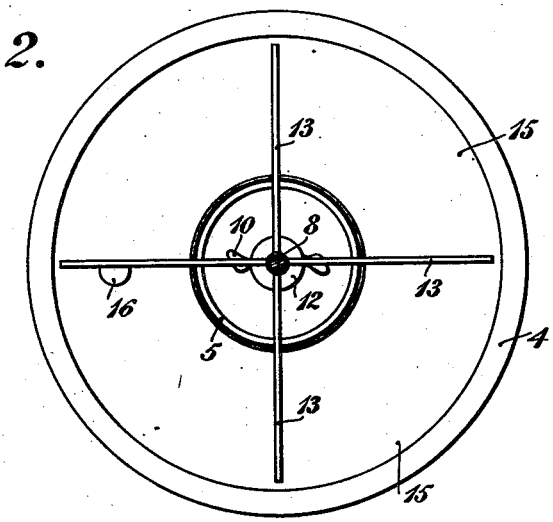
Figure 3:
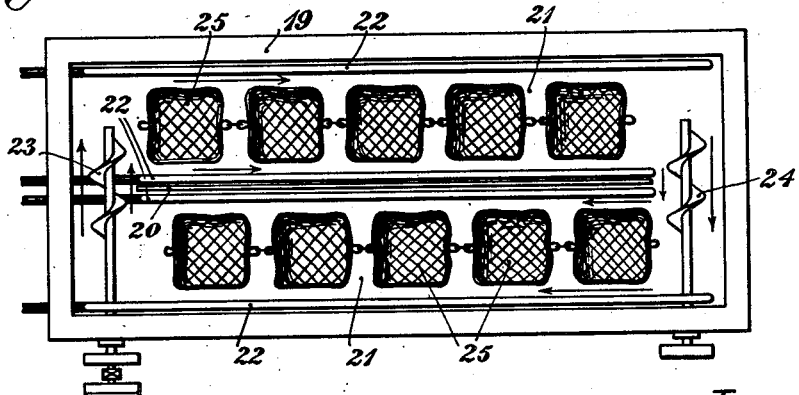

Figure 1 shows a vertical section of a simple kind of apparatus suitable for the performance of this method, Fig. 2 is a top view of the same apparatus with the cover removed, and Fig. 3 is a top view of an apparatus for continuous treatment of large quantities of comestibles.

The brine is placed in a sufficiently large, insulated vat or tub 4, Figs. 1 and 2, which contains a cylindrical coil of pipe 5, which, as indicated schematically in Fig. 1, is connected with the circulating pipe 7 of a refrigerating machine 6. In the cylindrical chamber surrounded by the refrigerating coil 5, which chamber is open at top and bottom, there is disposed a vertical shaft 8, which is run from a transmission, or countershaft 9, and which is supplied with a screw propeller or agitator 10, for keeping the brine in motion, and a shoulder 11, which serves as a support for a loose plate 12. This plate bears four horizontal arms 13, each of which carries its vertical plate 14, whereby the vat or tub 4 is divided into four quadrant-shaped chambers 15 (see Fig. 2). The brine consists of water containing, for instance, 15% common kitchen salt. By means of constant supply of cold from the refrigerating coil 5, the brine is cooled down until ice has formed on the coil and the surface of the brine. The temperature of the brine will then be about ten to twelve degrees below zero, Celsius. If the brine contains as much as 20% salt, the temperature will become lower in a corresponding degree, and will sink to, for instance, seventeen to twenty degrees below zero, Celsius.

When the brine, which is constantly kept in motion in the direction indicated by the arrow by means of the screw propeller or agitator 10, has the proper proportion between its degree of saturation and its temperature, which may be ascertained by the use of a floating weight and a thermometer placed in a pocket 16, and when there is also accumulated in the brine a suitable quantity of easily accessible, latent cold in the form of segregated ice, a suitably large quantity of the comestibles in question, for instance fish, in good, moist condition, is placed directly in the brine.

Depending upon the size of the respective pieces of comestibles, for instance fish, and the desired degree of freezing, they are kept entirely immersed in the brine either for a few minutes (bait, small fish, and fish of medium size which are to be frozen only superficially), or one half to one hour, or several hours (large cod, salmon, etc., which is to be frozen throughout for long transportation). For small fish, or when the fish is not to be frozen throughout, the temperature does not need to be lower than about five degrees below zero, Celsius, but the brine must then be diluted in a corresponding degree, for instance, only containing 8% salt.

Since the brine vat, or tub, is divided into four independent chambers 15 by means of the four plates 14, it is possible simultaneously to treat four different lots of comestibles, for by turning the cross 12, 13, 14, which is loosely suspended on the shaft 8, any one of the chambers 15 can be brought around under an inserting or removing opening 17 in the insulated cover 18.

Owing to the quantity of warmth contained in the comestibles immersed, the temperature of the brine may gradually rise during the treatment, with the result that the ice floating in the brine and deposited on the refrigerating coil gradually melts entirely or partially. At the first moment, however, just as the brine and the comestibles touch each other, there will occur an effect similar to that described above with respect to the drops of water, namely, that the moist surface of the fish will be instantly covered with a coating of ice, without any osmotic by-effect, so that the salt does not gain access even to the skin of the fish. The skin is at once osmotically or chemically insulated from the brine. The penetration of the salt into even the superficial tissues of the fish is once for all prevented, and it will not occur even if the brine, during the treatment, owing to the rise of temperature, should no longer show the aforesaid proper proportion between the degree of saturation and temperature.

When the comestibles are frozen throughout or are frozen as much as is desired, they are again taken up out of the brine and rinsed, and they will then on being exposed to the air quickly be covered with a coating of ice or hoar-frost, and in this connection they may be stored or packed for transportation. When the brine in the refrigerating vat, by a constantly renewed supply of cold from the refrigerating coil, is kept cooled off to or below its freezing-point, so that new ice is formed in it, a new quantity of comestibles may be immediately immersed. By suitably dividing the vat into compartments, or by the use of several vats, the procedure may easily be made continuous, in such a manner that in one vat or compartment of a vat fresh comestibles are constantly immersed, and in another vat or compartment of a vat refrigerated or frozen comestibles are constantly taken out. As an example, Fig. 3 shows an oblong vat 19, which, by means of a partition 20, is divided into two oblong chambers 21, along whose long sides refrigerating pipes 22 are disposed in the form of vertical pipe-walls. Two screw propellers or conveyers or other form of agitators, 23 and 24, the latter of which is driven from the former by means of a crossed belt, keep the brine in the vat circulating in the direction indicated by the arrow. A number of the baskets 25, intended to contain the comestibles in question, are placed in each of the chambers 21 and are drawn slowly lengthwise through these chambers. Each time the series of baskets has been drawn for instance to the left a distance corresponding to the length of a single basket, there is inserted at the right end of the respective chamber 21 a new basket of fresh comestibles, and at the left end of said chamber the last basket of frozen comestibles is taken out.

For the refrigerating or freezing of a certain quantity of commodities according to the present method there is, practically speaking, not required more cold than is theoretically necessary, or (when each kilogram of commodities is supposed thermically to equal about 0.8 kilogram of water) 0.8 calories for each degree that the commodity is refrigerated, plus 80 calories for each kilogram of frozen commodity. As a consequence of the direct effect of the cold and the relatively very great rapidity of the treatment, loss of cold by radiation, conduction, etc., can be reduced to a minimum. In many cases a refrigerating machine is not necessary, for the cold may be produced according to one or another of the methods generally in use in work with refrigerating mixtures.

It is in itself nothing new to freeze commodies in an environment which does not give a taste to the commodities, for instance in the air. In indirect freezing in the air, in such a manner that the commodities are placed free in the air, on open shelves, or the like, traversed by streams of refrigerating liquid or frigid air, the commodities are partially dried, and large ice crystallizations are slowly formed, and later on this causes discoloring, fraying, cracking porosity, etc., besides which the loss of cold is very great. Neither is it in itself anything new to refrigerate comestibles directly in a cold salt solution; but no one has hitherto proposed a method according to which, by the direct treatment of comestibles with a salt solution or a solution of another strongly tasting substance which is capable of lowering the dissolving-point, it is possible to refrigerate or freeze the comestibles without their absorbing this substance and thereby altering their natural, fresh character.

Having now particularly described and ascertained the nature of the said invention and in what manner the same is to be performed, I declare that what I claim is:

1. The process of preserving comestibles, which consists in subjecting them to the direct action of a refrigerating solution whose temperature at the beginning of the treatment is at or below the freezing point of the solution and whose strength is below saturation to thereby initially form a protective coating of fresh ice on the comestibles and then further refrigerating the comestibles thus protected while in said solution.

2. The process of preserving moist or wet comestibles, which consists in subjecting them to the direct action of a refrigerating solution whose temperature at the beginning of the treatment is at or below the freezing point of the solution and whose strength is below saturation to thereby initially and instantly form from the surface moisture of the comestible a protective coating of fresh ice which prevents penetration of the comestible by the solvent of the solution.

3. The process of preserving moist or wet comestibles, which consists in subjecting them to the direct action of a refrigerating solution which is under agitation and whose temperature at the beginning of the treatment is at or below the point at which ice crystals begin to form and whose strength is below saturation, said solution under such conditions initially and instantly forming from the surface moisture of the comestible a protective coating of fresh ice which prevents penetration of the comestible by the solvent of the solution.

4. The process of preserving comestibles, which consists in subjecting them to the direct action of a refrigerating liquid consisting of a common salt solution whose temperature at the beginning of the treatment is at or below the freezing point of said liquid, and whose strength is below saturation to thereby instantly form a protective coating of fresh ice on the comestible and then further refrigerating the comestible thus protected while in such solution.

5. The process of preserving moist or wet comestibles, which consists in subjecting them to the direct action of a refrigerating liquid comprising a common salt solution whose temperature at the beginning of the treatment is at or below the freezing point of said liquid and whose strength is below saturation, said liquid under said conditions instantly forming from the surface moisture of the comestible a protective coating of fresh ice which prevents penetration of the comestible by the salt solution.

6. The process of preserving moist or wet comestibles, which consists in subjecting them to the direct action of a partially congealed refrigerating solution whose temperature at the beginning of the treatment is at or below the freezing point of the solution, and whose strength is below saturation to thereby instantly form from the surface moisture of the comestible a protective coating of fresh ice which prevents penetration of the comestible by the solvent of the solution.

7. The process of preserving comestibles, which consists in first forming a protective coating of fresh ice on said comestibles by plunging them into a bath of a refrigerating liquid comprising a common salt solution at or below the freezing point and then further refrigerating the comestibles thus protected while in said refrigerating liquid.

In testimony, that I claim the foregoing as my invention, I have signed my name in presence of two subscribing witnesses.

ANTON JENSENIUS ANDREAS OTTESEN.

Witnesses:
HJALMAR CHARLES ERNEST BONTARD,
P. HOFMAN BANG.